Sept. 22, 1931.  J. L. CONNOLLY  1,823,879

WHEEL AND BRAKE SHOE

Original Filed Sept. 27, 1927

Inventor
John L. Connolly,
By Edmund H. Parry
Attorney

Patented Sept. 22, 1931

1,823,879

UNITED STATES PATENT OFFICE

JOHN L. CONNOLLY, OF NEW YORK, N. Y.

WHEEL AND BRAKE SHOE

Original application filed September 27, 1927, Serial No. 222,367. Divided and this application filed April 16, 1928. Serial No. 270,380.

This invention relates to improvements in wheels and brake-shoes.

The invention forming the subject-matter of this application is a division of my co-pending application Serial No. 222,367, filed September 27, 1927.

The principal object of the invention is to increase the power and efficiency of brakes, generally, by providing the brake-shoes with friction inserts adapted to contact with similar inserts in the treads of wheels designed to run on tracks, thus eliminating the use of sand and yet facilitating and insuring safer stops.

A further object of the invention is to provide wheels and brake-shoes with a groove of particular shape adapted to securely retain a friction-compound therein and to present the same at the contacting surfaces of these elements.

While the invention is particularly adapted to railway wheels and brake-shoes, it is not necessarily limited thereto but may be used in connection with other types of wheels.

It has heretofore been proposed to provide the braking surfaces of brake-shoes with inserts of friction-material, but in such cases the friction-material contacts directly with the metallic tread of the wheel and no great increase in the efficiency of the brake is attained by such constructions. By my invention, which includes the provision of a friction-insert in the wheel-tread so arranged as to contact with a similar insert in the brake-shoe when the brake is applied, the braking force is materially increased and, thus, the brakes rendered more efficient.

In the accompanying drawings, I have illustrated an embodiment of my invention; but it is to be understood that I am not limited to the particular form of wheel or brake-shoe therein shown.

Figure 1:
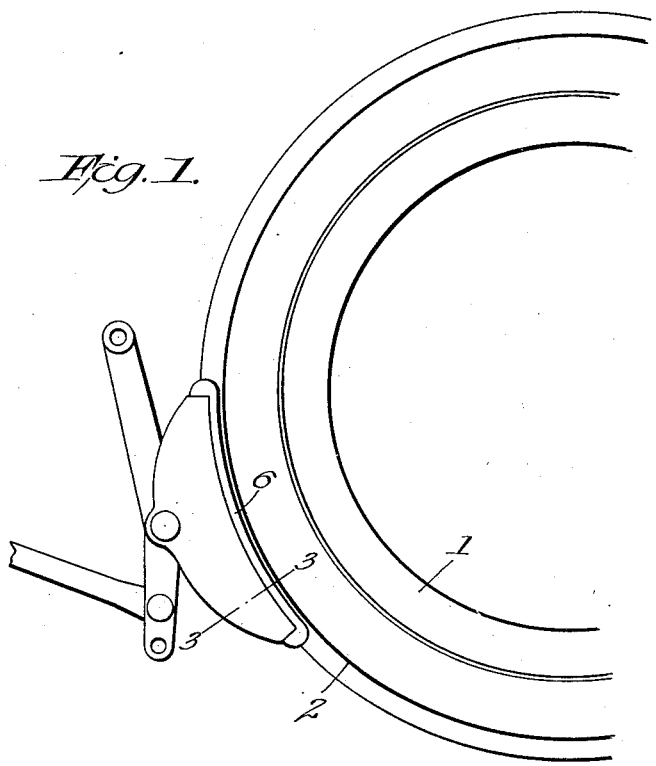
Fig. 1 is a side elevation of a railway wheel of well known construction, showing a brake-shoe in contact therewith.
Figure 2:
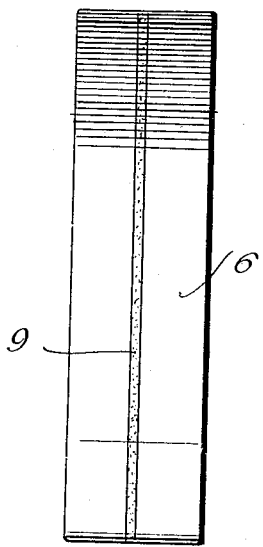
Fig. 2 is a front elevation of a brake-shoe, illustrating the friction-insert.
Figure 3:
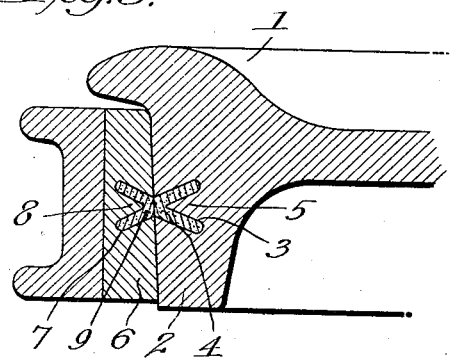
Fig. 3 is a sectional view, on line 3—3 of Fig. 1, showing the brake-shoe and wheel each provided with friction inserts which contact when the brake is applied.

Referring now to the drawings, the reference-numeral 1 indicates, generally, a railway wheel which may be of any well known and standard construction. The wheel is provided with a tread 2 in which is formed a groove 3 adapted to receive an insert of friction-material 4. As will be noted from the drawings, this groove extends about the entire periphery of the wheel. The side-walls of the groove diverge from the tread surface inwardly and at the base of the groove is provided a pyramidal projection 5. This projection forms with the side-walls of the groove a pair of diverging channels into which the friction compound is inserted. By reason of this construction of the groove, the compound is securely retained in the wheel and cannot work loose and drop out.

This groove is filled with a friction-compound consisting of sand, cement, asphalt, and other ingredients properly mixed in the presence of heat, which compound is inserted into the groove while in plastic state. The particular compound used forms the subject-matter of my co-pending application Serial No. 271,107, filed April 18, 1928, which is also a division of application Serial No. 222,367, filed September 27, 1927. As the tread of the wheel wears away, the surface of the friction-compound will also wear, thus presenting at all times a strip of friction-material at the wearing surface of the wheel.

The reference-numeral 6 indicates a brake-shoe which may be of any well known construction. The braking-face thereof is provided with a groove 7 which is similar to the groove 3 in the wheel and is provided with a pyramidal projection 8. This groove is filled with friction-compound 9 similar to that above described and is adapted to contact with the friction-compound in the wheel when the brake is applied.

By this arrangement, the use of sand on tracks is dispensed with, and yet the power of the brakes is increased, thus facilitating and insuring safer stops. As described in my co-pending application Serial No. 222,367, the efficiency of the brake is also materially increased by reason of the contact of the friction-insert in the wheel with that in the track.

It is believed that my invention and its many advantages have now been made clear. It will be obvious to those skilled in the art that the invention may be applied to any of the forms of wheels and brake-shoes now in use, and that it is not limited to the particular forms herein illustrated. It will also be understood that while I have herein illustrated the wheel and brake-shoe as having a single groove for containing the friction-compound, a plurality of grooves may be provided, if desired. When such is the case, the grooves in the wheel and brake-shoe will be so arranged that the friction-inserts in the respective members will contact when the brake is applied.

What I claim is:

1. In combination, a wheel having in its tread an insert of friction-material, and a brake-shoe having an insert of friction-material in the braking-face thereof adapted to contact with the insert in the wheel-tread when the brake is applied.

2. In combination, a wheel provided with a peripheral groove, a friction-compound inserted in said groove, and a brake-shoe having a groove in the braking-face thereof and provided with a friction-compound adapted to contact with that in the wheel when the brake is applied.

3. The combination of a wheel having in its tread a groove provided with a pyramidal projection, a friction compound in said groove, and a brake-shoe having in its breaking-surface a groove of similar shape to that in the wheel-tread, the last-mentioned groove containing a friction-compound adapted to contact with the compound in the wheel-tread when the brake is applied.

4. A brake-shoe provided with a longitudinally extending groove, a pyramidal projection in said groove, and a friction-compound inserted in said groove.

5. A brake-shoe provided with a longitudinally extending groove having diverging side-walls, a pyramidal projection in said groove, and a friction-compound inserted in said groove and lodged between the side-walls thereof and the sides of said projection.

6. A brake-shoe provided with a longitudinally extending groove having diverging side-walls, a pyramidal projection in said groove, and a friction-compound inserted in said groove and presenting at the braking-surface of said shoe a continuous strip of friction-material.

In testimony whereof I affix my signature.

JOHN L. CONNOLLY.